United States Patent
Sarrafi et al.

(10) Patent No.: US 12,316,946 B2
(45) Date of Patent: May 27, 2025

(54) METHOD, SYSTEM AND COMPUTER PROGRAM PRODUCT FOR DIVIDED PROCESSING IN PROVIDING OBJECT DETECTION FOCUS

(71) Applicant: MOTOROLA SOLUTIONS, INC., Chicago, IL (US)

(72) Inventors: Aral Sarrafi, Needham, MA (US); Jeffrey Hunter, North Vancouver (CA); Xiao Xiao, Winchester, MA (US); Sergey Veselkov, Ashland, MA (US); Cole Bush, Somerville, MA (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 171 days.

(21) Appl. No.: 17/455,687

(22) Filed: Nov. 19, 2021

(65) Prior Publication Data
US 2023/0164421 A1    May 25, 2023

(51) Int. Cl.
*G06T 7/11* (2017.01)
*G06T 7/215* (2017.01)
*G06T 7/277* (2017.01)
*H04N 7/18* (2006.01)
*H04N 23/61* (2023.01)
(Continued)

(52) U.S. Cl.
CPC ............... *H04N 23/61* (2023.01); *G06T 7/11* (2017.01); *G06T 7/215* (2017.01); *G06T 7/277* (2017.01); *H04N 7/18* (2013.01); *H04N 23/62* (2023.01); *H04N 23/661* (2023.01);
(Continued)

(58) Field of Classification Search
CPC . G06T 2207/20216; G06T 2207/30232; G06T 7/11; G06T 7/215; G06T 7/277; G06V 20/52; H04N 23/61; H04N 23/62; H04N 23/661; H04N 23/675; H04N 7/18
See application file for complete search history.

(56) References Cited

U.S. PATENT DOCUMENTS 7,526,102 B2    4/2009  Ozer
10,402,689 B1 *  9/2019  Bogdanovych .......... G06N 3/04
(Continued)

FOREIGN PATENT DOCUMENTS

WO    WO-2017053822 A1 *  3/2017  ......... G06K 9/00295
WO    WO-2017095807 A1 *  6/2017  ......... G06K 9/00248

OTHER PUBLICATIONS

Ren et al., Faster R-CNN: Towards Real-Time Object Detection with Regional Proposal Networks, IEEE Transactions on Pattern Analysis and Machine Intelligence, vol. 39, No. 6, Jun. 2017.*
(Continued)

*Primary Examiner* — Luis Perez-Fuentes (57) ABSTRACT

A method, system and computer program product for divided processing in providing object detection focus is disclosed. The system includes a first video analytics determinator configured to provide, by infrequent employment thereof within the system, a partial object detection focus in first information that informs as to where moving objects are likely and unlikely to appear within video frames in respect of video. The system also includes a second video analytics determinator configured to: informatively employ the first information to determine a refined object detection focus; and provide the refined tracking and/or object detection focus in second information.

18 Claims, 7 Drawing Sheets

(51) Int. Cl.
 *H04N 23/62* (2023.01)
 *H04N 23/661* (2023.01)
 *H04N 23/67* (2023.01)

(52) U.S. Cl.
 CPC . *H04N 23/675* (2023.01); *G06T 2207/20216* (2013.01); *G06T 2207/30232* (2013.01)

(56) References Cited

U.S. PATENT DOCUMENTS

| | | | |
|---|---|---|---|
| 10,671,855 B2* | 6/2020 | Lee | G06V 20/49 |
| 10,897,558 B1* | 1/2021 | Sun | G06T 5/20 |
| 11,080,559 B2* | 8/2021 | Chaubard | G06F 18/214 |
| 11,170,267 B1 | 11/2021 | Lee et al. | |
| 11,210,799 B2* | 12/2021 | Jacobs | G06T 7/593 |
| 11,410,307 B2* | 8/2022 | Rijken | A61B 6/5235 |
| 11,863,729 B2* | 1/2024 | Wu | G06T 3/40 |
| 12,061,094 B2* | 8/2024 | Iqbal | G06V 20/588 |
| 2014/0347475 A1 | 11/2014 | Divakaran et al. | |
| 2019/0332897 A1* | 10/2019 | Chen | G06T 7/215 |
| 2020/0090321 A1* | 3/2020 | Xu | G06V 10/772 |
| 2020/0097769 A1* | 3/2020 | Lipchin | G06V 40/167 |
| 2020/0098114 A1* | 3/2020 | Kudriashov | G06T 7/90 |
| 2020/0111219 A1 | 4/2020 | Potocek et al. | |
| 2020/0219271 A1* | 7/2020 | Davis | G06T 7/277 |
| 2022/0044407 A1* | 2/2022 | Liu | G06T 7/11 |
| 2023/0128637 A1* | 4/2023 | Kouris | G06V 10/70 382/173 |

OTHER PUBLICATIONS

Fully convolutional instance-aware semantic segmentation; Li—2017. (Year: 2017).*

Lucid data dreaming for multiple object tracking; Khoreva—2017. (Year: 2017).*

X. Xue, Y. Li, X. Yin, C. Shang, T. Peng and Q. Shen, "Semantic-Aware Real-Time Correlation Tracking Framework for UAV Videos," in IEEE Transactions on Cybernetics, doi: 10.1109/TCYB.2020.3005453.

L. Liu, J. Xing, H. Ai and S. Lao, "Semantic superpixel based vehicle tracking," Proceedings of the 21st International Conference on Pattern Recognition (ICPR2012), 2012, pp. 2222-2225.

S. S. Pathan, A. Al-Hamadi, T. Senst and B. Michaelis, "Multi-object tracking using semantic analysis and Kalman filter," 2009 Proceedings of 6th International Symposium on Image and Signal Processing and Analysis, 2009, pp. 271-276, doi: 10.1109/ISPA.2009.5297722.

Dongdong Zeng, Xiang Chen, Ming Zhu, Michael Goesele, Arjan Kuijper: "Background Subtraction with Real-time Semantic Segmentation", Cornell University, arXiv.org > cs > arXiv:1811.10020, Dec. 12, 2018, all pages.

Peter Ondruska, Julie Dequaire, Dominic Zeng Wang, Ingmar Posner: "End-to-End Tracking and Semantic Segmentation Using Recurrent Neural Networks", Cornell University, arXiv.org > cs > arXiv:1604.05091, Apr. 19, 2016, all pages.

The International Search Report and the Written Opinion, corresponding patent application No. PCT/US2022/046848 filed: Oct. 17, 2022, mailed Jan. 23, 2023, all pages.

* cited by examiner

METHOD, SYSTEM AND COMPUTER PROGRAM PRODUCT FOR DIVIDED PROCESSING IN PROVIDING OBJECT DETECTION FOCUS

BACKGROUND

Computer-implemented visual object detection and recognition is understood by those skilled in the art as pertaining to locating and classifying visual representations of real-life objects found in still images or video captured by a camera. By performing visual object recognition, each visual object found in the still images or video is classified according to its type (such as, for example, human, vehicle, or animal).

Automated security systems typically employ video cameras and/or other image capturing devices or sensors to collect image data (such as video). Images represented by the image data may be displayed for contemporaneous screening by security personnel and/or recorded for later review after a security breach. Computer-implemented visual object detection and recognition can greatly assist security personnel and others in connection with these sorts of activities.

BRIEF DESCRIPTION OF THE SEVERAL VIEWS OF THE DRAWINGS

In the accompanying figures similar or the same reference numerals may be repeated to indicate corresponding or analogous elements. These figures, together with the detailed description, below are incorporated in and form part of the specification and serve to further illustrate various embodiments of concepts that include the claimed invention, and to explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help improve understanding of embodiments of the present disclosure.

The system, apparatus, and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION OF THE INVENTION

In accordance with one example embodiment, there is provided a computer-implemented method that includes receiving, for at least a time duration, video data at an input of a computing system. The computing system includes a first video analytics determinator that, over a first full length execution period, consumes a first processor resource allocation that is too large to be suitable for continuous repeated employment within a single camera device. The computing system also includes a second video analytics determinator, provided on the single camera device. The second video analytics determinator has a second full length execution period, and consumes a second processor resource allocation taken from the single camera device. The second video analytics determinator is suitable for being repeatedly employed, and being at least substantially continuously active during such time when being repeatedly employed. The computer-implemented method also includes infrequently employing the first video analytics determinator to provide a partial object detection focus in first information that informs as to where moving objects are likely and unlikely to appear within video frames in respect of the video data. The computer-implemented method also includes repeatedly employing the second video analytics determinator on the video data over the time duration, and informed by the first information, to provide a refined object detection focus in second information.

In some implementations, the above-mentioned first video analytics determinator may provide third information as to at least one frame area where the moving objects are likely to become at least partially occluded, temporarily, by one or more static objects. In response to the third information: i) an exit location of a tracked moving object, adjacent the at least one frame area, may be predicted to facilitate a tracking resumption in relation to the tracked moving object, or ii) a search around a plurality of boundaries of the at least one frame area is carried out after the tracked moving object becomes occluded.

In accordance with another example embodiment, there is provided a computing system that has an input, in operative association with an image sensor of a camera device, to receive video for at least a time duration during computing system operation. The computing system includes a first video analytics determinator configured to consume a first processor resource allocation, over a first full length execution period of the first video analytics determinator, that is too large to be suitable for continuous repeated employment within the camera device. The first video analytics determinator is also configured to provide, by infrequently employment thereof within the computing system, a partial object detection focus in first information that informs as to where moving objects are likely and unlikely to appear within video frames in respect of the video. The computing system also includes a second video analytics determinator, provided on the camera device, that has a second full length execution period. The second video analytics determinator is configured to consume a second processor resource allocation taken from the camera device. The second video analytics determinator is also configured to informatively employ the first information to determine a refined object detection focus, and to provide the refined object detection focus in second information. The second video analytics determinator is repeatedly employed on video data of the video over the time duration. The second video analytics determinator is also at least substantially continuously active during such time when being repeatedly employed.

Each of the above-mentioned embodiments will be discussed in more detail below, starting with example system and device architectures of the system in which the embodiments may be practiced, followed by an illustration of processing blocks for achieving an improved technical method, device, and system for divided processing in providing object detection focus.

Example embodiments are herein described with reference to flowchart illustrations and/or block diagrams of methods, apparatus (systems) and computer program products according to example embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a special purpose and unique machine, such that the instructions, which execute via the processor of the computer or other programmable data processing apparatus, create means for implementing the functions/acts specified in the flowchart and/or block diagram block or blocks. The methods and processes set forth herein need not, in some embodiments, be performed in the exact sequence as shown and likewise various blocks may be performed in parallel rather than in sequence. Accordingly, the elements of methods and processes are referred to herein as "blocks" rather than "steps."

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus that may be on or off-premises, or may be accessed via the cloud in any of a software as a service (SaaS), platform as a service (PaaS), or infrastructure as a service (IaaS) architecture so as to cause a series of operational blocks to be performed on the computer or other programmable apparatus to produce a computer implemented process such that the instructions which execute on the computer or other programmable apparatus provide blocks for implementing the functions/acts specified in the flowchart and/or block diagram block or blocks. It is contemplated that any part of any aspect or embodiment discussed in this specification can be implemented or combined with any part of any other aspect or embodiment discussed in this specification.

The term "object" as used herein is understood to have the same meaning as would normally be given by one skilled in the art of video analytics, and examples of objects may include moving objects such as, for instance, humans, vehicles, animals, etcetera. Examples of objects also include static objects such as, for instance, buildings, roads, fixtures, etcetera. Also, it will be understood that sometimes certain objects (such as, for example, humans, vehicles, etcetera) may be temporarily static. Thus, where appropriate for the context, the term moving object as used herein may include objects that are temporarily static at a certain point in time, but are moving (or expected to be moving) at a different point in time.

The term "video data" as used herein includes actual video, video metadata, or a combination of both.

Further advantages and features consistent with this disclosure will be set forth in the following detailed description, with reference to the figures.

Figure 1:
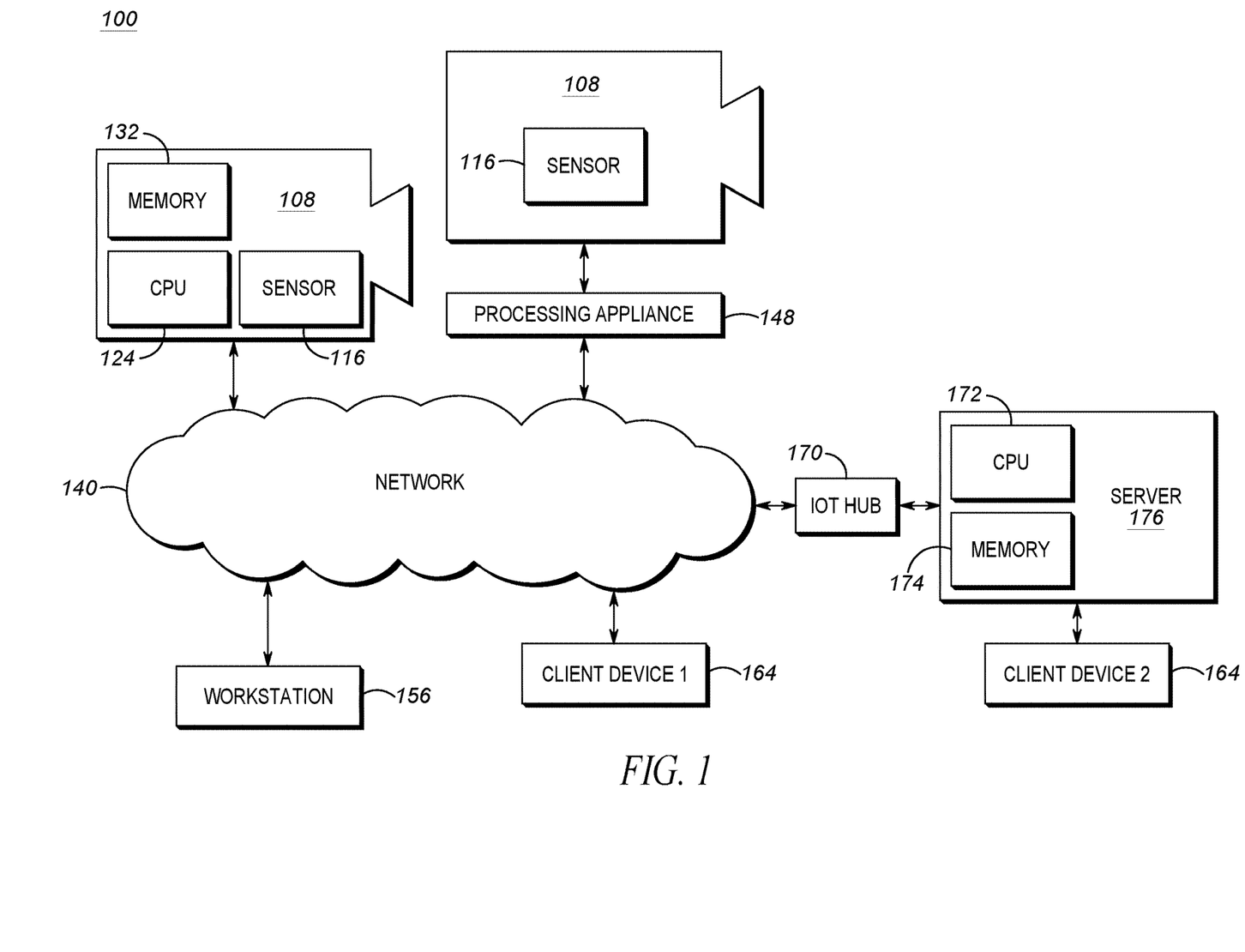
FIG. 1 is a block diagram of connected devices of a video security system according to an example embodiment.

Referring now to the drawings, and in particular FIG. 1, therein illustrated is a block diagram of connected devices of a video security system 100 according to an example embodiment. The video security system 100 includes hardware and software that perform the processes and functions described herein.

The video security system 100 includes a video capture device 108 being operable to capture a plurality of images and produce image data representing the plurality of captured images. The video capture device 108 or camera device 108 is an image capturing device and includes security video cameras.

Each video capture device 108 includes an image sensor 116 for capturing a plurality of images. The video capture device 108 may be a digital video camera and the image sensor 116 may output captured light as a digital data. For example, the image sensor 116 may be a CMOS, NMOS, or CCD. In some embodiments, the video capture device 108 may be an analog camera connected to an encoder.

The image sensor 116 may be operable to capture light in one or more frequency ranges. For example, the image sensor 116 may be operable to capture light in a range that substantially corresponds to the visible light frequency range. In other examples, the image sensor 116 may be operable to capture light outside the visible light range, such as in the infrared and/or ultraviolet range. In other examples, the video capture device 108 may be a multi-sensor camera that includes two or more sensors that are operable to capture light in same or different frequency ranges.

The video capture device 108 may be a dedicated camera. It will be understood that a dedicated camera herein refers to a camera whose principal features is to capture images or video. In some example embodiments, the dedicated camera may perform functions associated with the captured images or video, such as but not limited to processing the image data produced by it or by another video capture device 108. For example, the dedicated camera may be a security camera, such as any one of a pan-tilt-zoom camera, dome camera, in-ceiling camera, box camera, and bullet camera.

Additionally, or alternatively, the video capture device 108 may include an embedded camera. It will be understood that an embedded camera herein refers to a camera that is embedded within a device that is operational to perform functions that are unrelated to the captured image or video. For example, the embedded camera may be a camera found on any one of a laptop, tablet, drone device, smartphone, video game console or controller.

Each video capture device 108 may include a processor 124, a memory device 132 coupled to the processor 124 and a network interface. The memory device can include a local memory (such as, for example, a random access memory and a cache memory) employed during execution of program instructions. The processor executes computer program instructions (such as, for example, an operating system and/or application programs), which can be stored in the memory device.

In various embodiments the processor 124 may be implemented by any suitable processing circuit having one or more circuit units, including a digital signal processor (DSP), graphics processing unit (GPU) embedded processor, a visual processing unit or a vision processing unit (both referred to herein as "VPU"), etc., and any suitable combination thereof operating independently or in parallel, including possibly operating redundantly. Such processing circuit may be implemented by one or more integrated circuits (IC), including being implemented by a monolithic integrated circuit (MIC), an Application Specific Integrated Circuit (ASIC), a Field Programmable Gate Array (FPGA), etc. or any suitable combination thereof. Additionally or alternatively, such processing circuit may be implemented as a programmable logic controller (PLC), for example. The processor may include circuitry for storing memory, such as digital data, and may comprise the memory circuit or be in wired communication with the memory circuit, for example.

In various example embodiments, the memory device 132 coupled to the processor circuit is operable to store data and computer program instructions. Typically, the memory device is all or part of a digital electronic integrated circuit or formed from a plurality of digital electronic integrated circuits. The memory device may be implemented as Read-Only Memory (ROM), Programmable Read-Only Memory (PROM), Erasable Programmable Read-Only Memory (EPROM), Electrically Erasable Programmable Read-Only Memory (EEPROM), flash memory, one or more flash drives, universal serial bus (USB) connected memory units, magnetic storage, optical storage, magneto-optical storage, etc. or any combination thereof, for example. The memory device may be operable to store memory as volatile memory, non-volatile memory, dynamic memory, etc. or any combination thereof.

In various example embodiments, a plurality of the components of the video capture device 108 may be implemented together within a system on a chip (SOC). For example, the processor 124, the memory device 132 and the network interface may be implemented within an SOC. Furthermore, when implemented in this way, a general purpose processor and one or more of a GPU or VPU, and a DSP may be implemented together within the SOC.

Continuing with FIG. 1, each of the video capture devices 108 is connected to a network 140. Each video capture device 108 is operable to output image data representing images that it captures and transmit the image data over the network.

It will be understood that the network 140 may be any suitable communications network that provides reception and transmission of data. For example, the network 140 may be a local area network, external network (such as, for example, a WAN, or the Internet) or a combination thereof. In other examples, the network 140 may include a cloud network.

In some examples, the video security system 100 includes a processing appliance 148. The processing appliance 148 is operable to process the image data output by a video capture device 108. The processing appliance 148 also includes one or more processors and one or more memory devices coupled to a processor (CPU). The processing appliance 148 may also include one or more network interfaces. For convenience of illustration, only one processing appliance 148 is shown; however it will be understood that the video security system 100 may include any suitable number of processing appliances 148.

For example, and as illustrated, the processing appliance 148 is connected to a video capture device 108 which may not have memory 132 or CPU 124 to process image data. The processing appliance 148 may be further connected to the network 140.

According to one example embodiment, and as illustrated in FIG. 1, the video security system 100 includes a workstation 156, each having one or more processors including graphics processing units (GPUs). The workstation 156 may also include storage memory. The workstation 156 (which in some examples is absent from the video security system 100) receives image data from at least one video capture device 108 and performs processing of the image data. The workstation 156 may further send commands for managing and/or controlling one or more of the video capture devices 108. The workstation 156 may receive raw image data from the video capture device 108. Alternatively, or additionally, the workstation 156 may receive image data that has already undergone some intermediate processing, such as processing at the video capture device 108 and/or at a processing appliance 148. The workstation 156 may also receive metadata from the image data and perform further processing of the image data. The received metadata may include, inter alia, object detection and classification information.

It will be understood that while a single workstation 156 is illustrated in FIG. 1, the workstation may be implemented as an aggregation of a plurality of workstations.

FIG. 1 also depicts a server 176 that is communicative with the camera devices 108, the processing appliance 148, and the workstation 156 via the network 140 and an Internet-Of-Things hub 170 ("IOT hub"). The server 176 may be an on-premises server or it may be hosted off-site (such as, for example, a public cloud). The server 176 comprises one or more processors 172, one or more memory devices 174 coupled to the one or more processors 172, and one or more network interfaces. As with the camera devices 108, the memory device 174 can include a local memory (such as, for example, a random access memory and a cache memory) employed during execution of program instructions. The processor 172 executes computer program instructions (such as, for example, an operating system and/or application programs), which can be stored in the memory device 174. In at least some example embodiments, circuitry or other implementations of the processor 124 and memory device 132 of the camera devices 108 may also be used for the processor 172 and memory device 174 of the server 176. In at least some example embodiments, the IOT hub 170 is a cloud-hosted, managed service that bi-directionally connects the server 176 to the rest of the network 140 and the devices connected to it, such as the camera device 108. The IOT hub 170 may, for example, comprise part of the Microsoft™ Azure™ cloud computing platform, and the server 176 may accordingly be cloud-hosted using the Microsoft™ Azure™ platform. Different example embodiments are possible. For example, the IOT hub 170 may be replaced with one or more of an Ethernet hub, router, and switch (managed or unmanaged), regardless of whether the server 176 is cloud-hosted. The server 176 may additionally or alternatively be directly connected to any one or more of the other devices of the video security system 100. Further, while use of the IOT hub 170 implies that the server 176 is networked to a large number of Internet-connected computing appliances, this may be the case in certain embodiments and not in others. For example, the video security system 100 may comprise a very large number of the camera devices 108; alternatively, the video security system 100 may comprise only a handful of camera devices 108 and other network-connected devices or appliances, and the IOT hub 170 may nonetheless still be used.

Any one or more of the camera devices 108, processing appliance 148, and workstation 156 may act as edge devices that communicate with the server 176 via the network 140 and IOT hub 170. Any of the edge devices may, for example, perform initial processing on captured video and subsequently send some or all of that initially processed video to the server 176 for additional processing.

The video security system 100 further includes a pair of client devices 164 (two shown for purposes of illustration; however any suitable number is contemplated). In FIG. 1, a first client device 164 is connected to the network 140, and a second client device 164 is connected to the server 176. The client device 164 is used by one or more users to interact with the video security system 100. Accordingly, the client device 164 includes a display device and a user input device (such as, for example, a mouse, keyboard, or touchscreen). (The workstation 156 may, in some examples, include similar devices as well.) The client device 164 is operable to display on its display device a user interface for displaying information, receiving user input, and playing back video (the workstation 156 may, in some examples, include a similar user interface as well). For example, the client device may be any one of a personal computer, laptop, tablet, personal data assistant (PDA), cell phone, smart phone, gaming device, and other mobile device.

The client device 164 is operable to receive image data over the network 140 and is further operable to playback the received image data. A client device 164 may also have functionalities for processing image data. For example, processing functions of a client device 164 may be limited to processing related to the ability to playback the received image data. In other examples, image processing functionalities may be shared between the workstation 156 and one or more client devices 164. In still other examples, image processing functionalities may be shared amongst two or more of the video capture devices 108, the one or more client devices 164, the processing appliance 148, and the workstation 156.

Figure 2A:
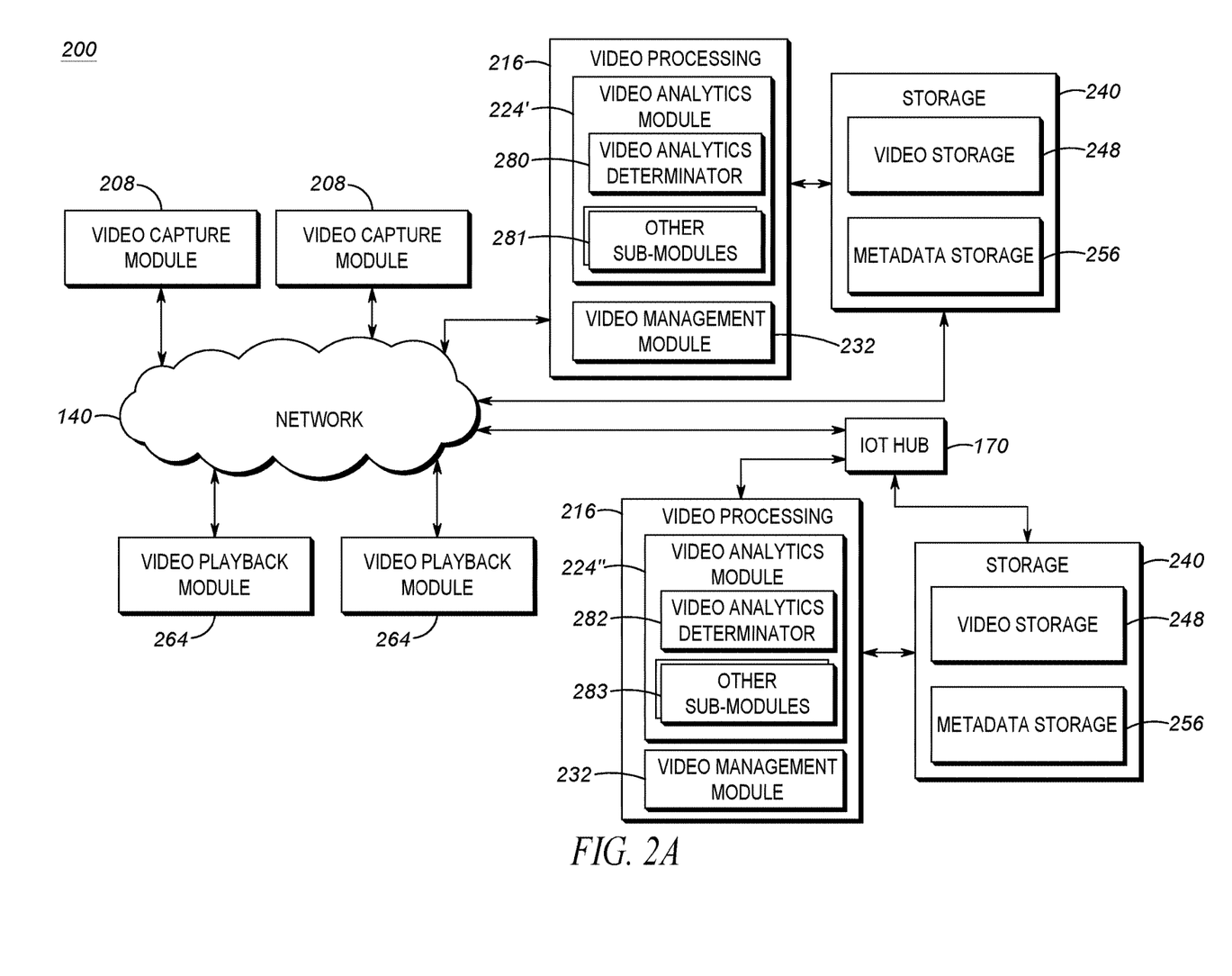
FIG. 2A is a block diagram of a set of operational modules of the video security system according to an example embodiment.

Referring now to FIG. 2A, therein illustrated is a block diagram of a set 200 of operational modules of the video security system 100 according to one example embodiment. The operational modules may be implemented in hardware, software or both on one or more of the devices of the video security system 100 as illustrated in FIG. 1.

The set 200 of operational modules includes video capture modules 208 (two shown for purposes of illustration; however any suitable number is contemplated). For example, each video capture device 108 may implement a video capture module 208. The video capture module 208 is operable to control one or more components (such as, for example, sensor 116) of a video capture device 108 to capture images.

The set 200 of operational modules includes a subset 216 of image/video data processing modules. For example, and as illustrated, the subset 216 of image/video data processing modules includes a video analytics module 224 and a video management module 232.

The video analytics module 224 receives image data and analyzes the image data to determine properties or characteristics of the captured image or video, of objects found in the scene represented by the image or video, etcetera. Based on the determinations made, the video analytics module 224 may further output metadata providing information about the determinations. Examples of determinations made by the video analytics module 224 may include one or more of foreground/background segmentation, object detection, object tracking, object classification, virtual tripwire, anomaly detection, facial detection, facial recognition, license plate recognition, identifying objects "left behind" or "removed", unusual motion, and business intelligence. However, it will be understood that other video analytics functions known in the art may also be implemented by the video analytics module 224. The video analytics module 224 may include one or more neural networks (for example, one or more convolutional neural networks) to implement artificial intelligence functionality. The size, power and complexity of these neural networks may vary based on factors related to design choice such as, for example, where the neural network will reside. For instance, a neural network residing on the video capture device 108 may be smaller and less complex than a neural network residing in the server 176.

The video analytics module 224 may include a plurality of sub-modules. For instance, the video analytics module 224' includes video analytics determinator 280 (described in more detail later herein) and other sub-modules 281 (such as, for example, a learning machine observations sub-module, one or more categorizer sub-modules, etcetera). Also, the video analytics module 224" includes video analytics determinator 282 (described in more detail later herein) and other sub-modules 283 (such as, for example, classification refinement submodule, appearance search learning machine, etcetera).

Continuing on, the video management module 232 receives image data and performs processing functions on the image data related to video transmission, playback and/or storage. For example, the video management module 232 can process the image data to permit transmission of the image data according to bandwidth requirements and/or capacity. The video management module 232 may also process the image data according to playback capabilities of a client device 164 that will be playing back the video, such as processing power and/or resolution of the display of the client device 164. The video management module 232 may also process the image data according to storage capacity within the video security system 100 for storing image data.

The set 200 of operational modules further include a subset 240 of storage modules (storage). For example, and as illustrated, the subset 240 of storage modules include a video storage module 248 and a metadata storage module 256. The video storage module 248 stores image data, which may be image data processed by the video management module. The metadata storage module 256 stores information data output from the video analytics module 224. Also, it is contemplated that training data as herein described may be stored in suitable storage device(s). More specifically, image and/or video portions of the training data may be stored in the video storage module 248, and metadata portions of the training data may be stored in the metadata storage module 256.

It will be understood that while video storage module 248 and metadata storage module 256 are illustrated as separate modules, they may be implemented within a same hardware storage whereby logical rules are implemented to separate stored video from stored metadata. In other example embodiments, the video storage module 248 and/or the metadata storage module 256 may be implemented using hardware storage using a distributed storage scheme.

The set of operational modules further includes video playback modules 264 (two shown for purposes of illustration; however any suitable number is contemplated), which are operable to receive image data and playback the image data as a video. For example, the video playback module 264 may be implemented on a client device 164.

In some example embodiments, some functionalities of an operational module of the set 200 may be partly implemented on a first device while other functionalities of an operational module may be implemented on a second device. For example, video analytics functionalities may be split between two or more of the video capture device 108, processing appliance 148, server 176, and workstation 156. Similarly, video management functionalities may be split between two or more of a video capture device 108, processing appliance 148, server 176, and workstation 156.

Figure 2B:
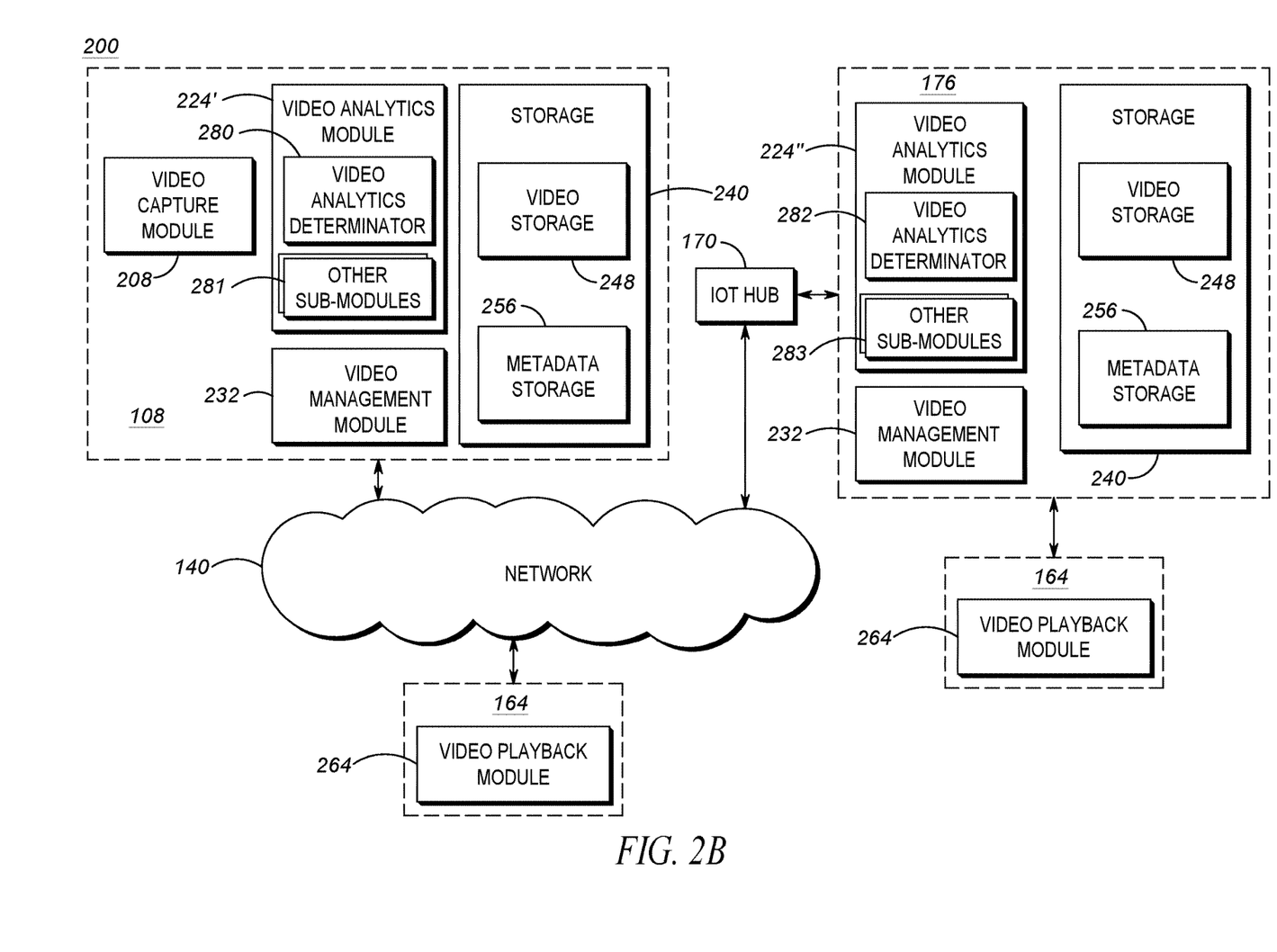
FIG. 2B is a block diagram of a set of operational modules of the video security system according to one particular example embodiment in which a video analytics module, a video management module, and storage are wholly implemented on each of a video capture device and a server.

Referring now to FIG. 2B, therein illustrated is a block diagram of a set 200 of operational modules of the video security system 100 according to one particular example embodiment in which the video analytics module 224, the video management module 232, and the storage 240 is wholly implemented on each of the camera device 108 and the server 176. The video analytics module 224, the video management module 232, and the storage 240 may additionally or alternatively be wholly or partially implemented on one or more processing appliances 148. The video playback module 264 is implemented on each of the client devices 164, thereby facilitating playback from either device. As mentioned above in respect of FIG. 1, the video analytics implemented on the camera device 108 and on the server 176 may complement each other.

It will be appreciated that allowing the subset 216 of image/video data processing modules to be implemented on a single device or on various devices of the video security system 100 allows flexibility in building the video security system 100.

For example, one may choose to use a particular device having certain functionalities with another device lacking those functionalities. This may be useful when integrating devices from different parties (such as, for example, manufacturers) or retrofitting an existing video security system.

Figure 3:
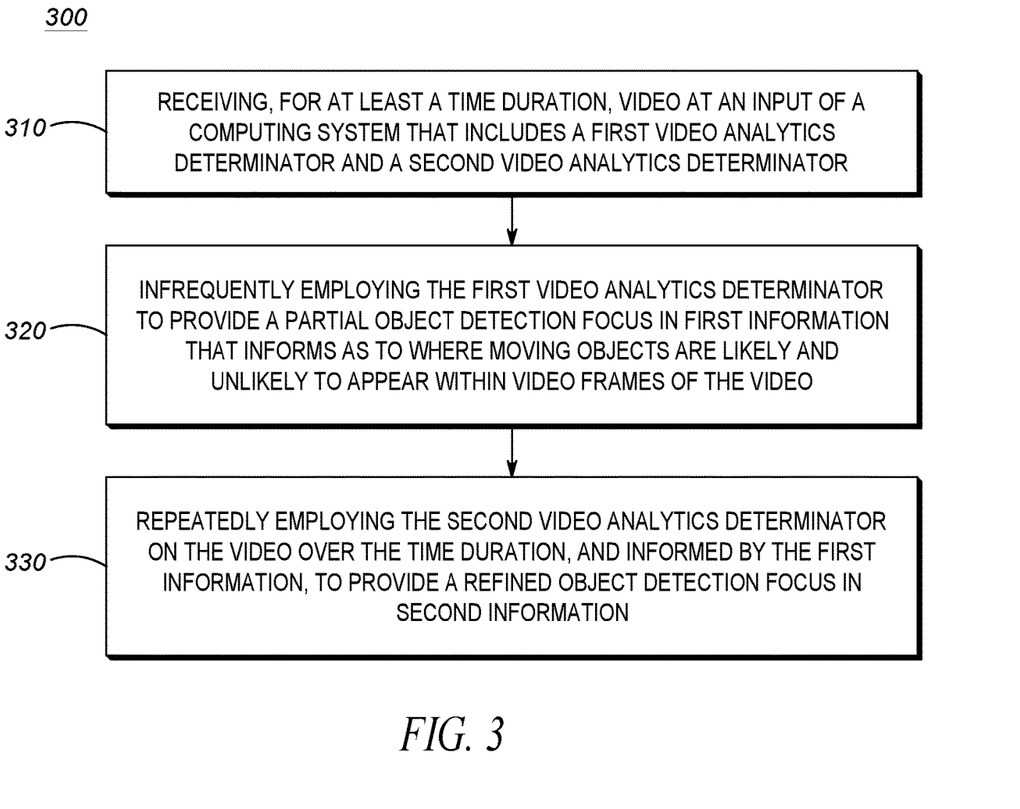
FIG. 3 is a flow chart illustrating a computer-implemented method in accordance with an example embodiment.

FIG. 3 is a flow chart illustrating a computer-implemented method 300 in accordance with an example embodiment. The illustrated computer-implemented method 300 includes receiving (310), for at least a time duration, video data at an input of a computing system that includes a first video analytics determinator and a second video analytics determinator. For instance, when the set 200 of operational modules of FIGS. 2A and 2B implement the example embodiment of FIG. 3, the second video analytics determinator and the first video analytics determinator may be the video analytics determinator 280 and the video analytics determinator 282 respectively. Furthermore, the video data may be captured by the image sensor 116 of the camera device 108 (FIG. 1) and transmitted to an input of the video analytics module 224' (which forms a part of the aforementioned computing system).

Over a first full length execution period, the (first) video analytics determinator 282 consumes a first processor resource allocation that is too large to be suitable for continuous repeated employment within a single one of the camera devices 108. Regarding the (second) video analytics determinator 280, this is provided on a single one of the camera devices 108 and has a second full length execution period, that consumes a second processor resource allocation (taken from the camera device 108). The second video analytics determinator is suitable for being repeatedly employed, and at least substantially continuously active during such time when being repeatedly employed.

Next, the computer-implemented method 300 includes infrequently employing (320) the first video analytics determinator (for example, video analytics determinator 282) to provide a partial object detection focus in first information that informs as to where moving objects are likely and unlikely to appear within video frames in respect of the video data.

Figure 4:
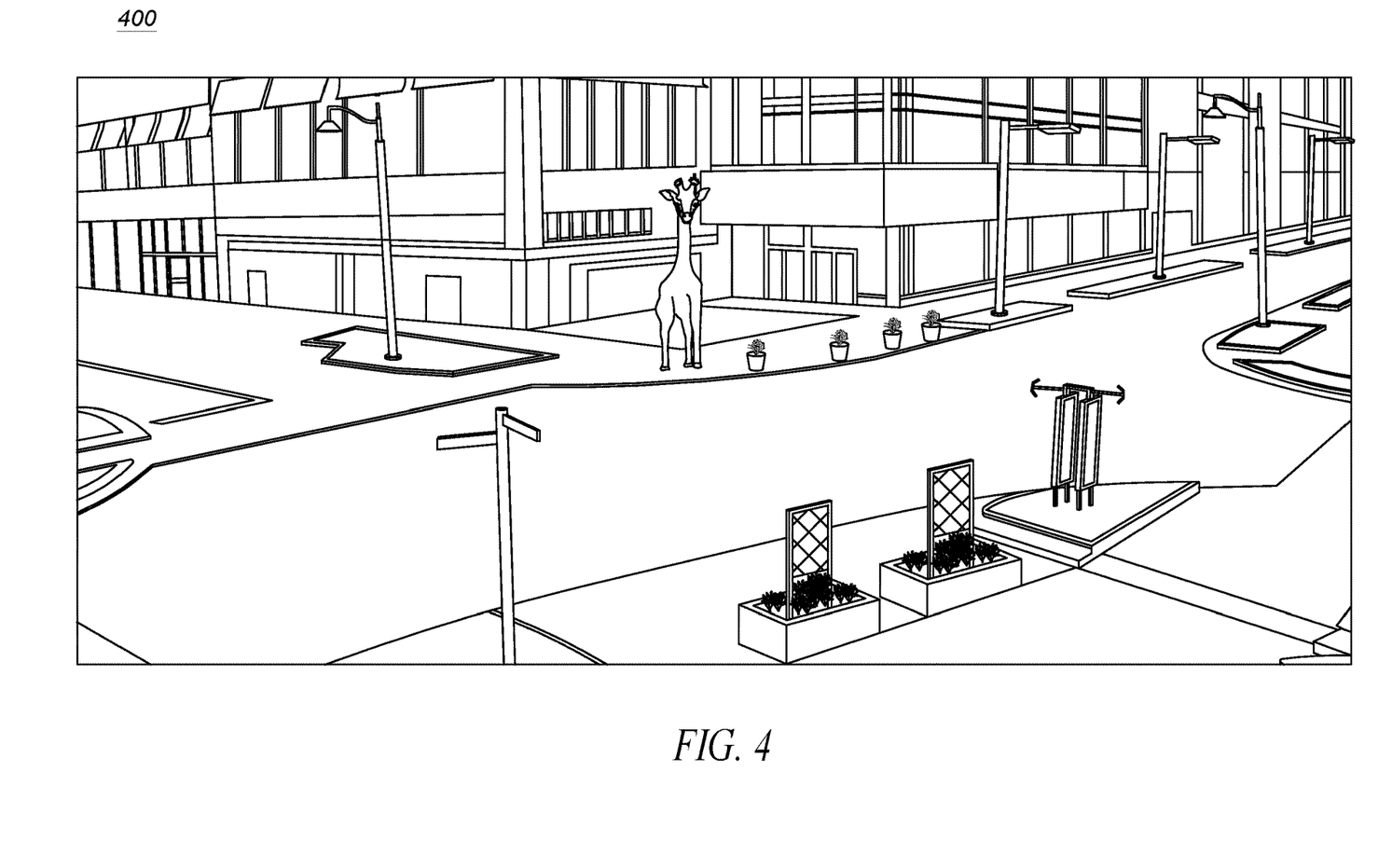
FIG. 4 is a diagram of an example background image that may be employed in connection with the example embodiment of FIG. 3.

In some examples, operation of the video analytics determinator 282 includes generating a semantic segmentation mask in connection with a masking preparation and application process. For instance, as a first action in the masking preparation and application process, a plurality of frames can be selected from video captured by one of the camera devices 108 (for example, the video management module 232 may create a handler to intercept frames) and then these frames may be averaged to construct a background image (i.e. as understood by those skilled in the art, such averaging may remove moving objects). FIG. 4 is a diagram of an example background image 400 constructed in this manner.

As a next action in the masking preparation and application process, the constructed background image (or, more generally, some suitable form of scene image information) may be transmitted to the video analytics determinator 282. For example, the background image 400 may be sent from the camera device 108, over the network 140, to the server 176. The image file format for the background image 400 may any suitable format such as, for instance, PNG, JPG, etc.

Figure 5:
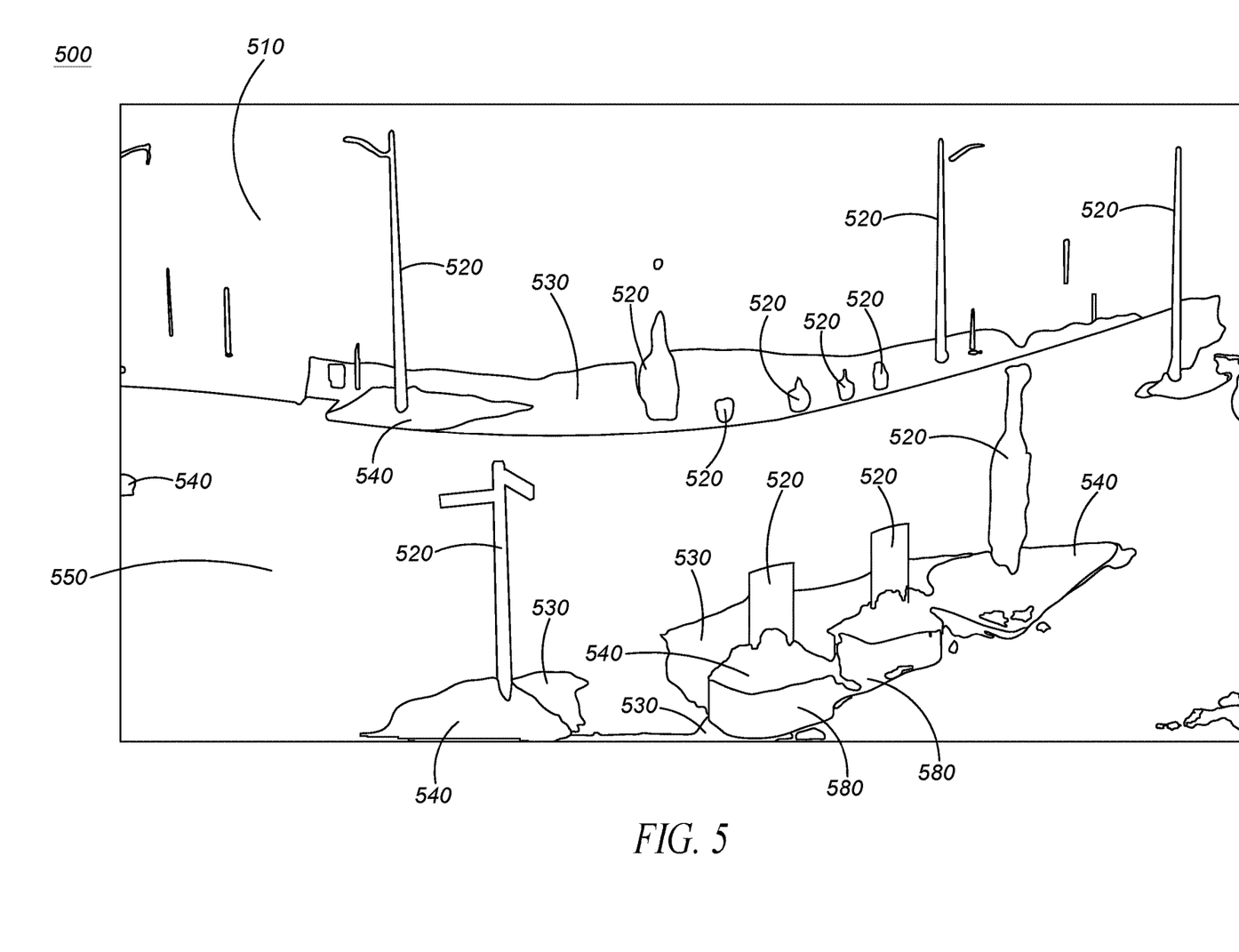
FIG. 5 is a diagram of an example segmentation mask that may be employed in connection with the example embodiment of FIG. 3.

As a next action in the masking preparation and application process, the background image is employed by the video analytics determinator 282 to generate a semantic segmentation mask/image. For example, the server 176 may include a semantic segmentation learning machine (such as, for instance, a convolutional neural network) that takes the background image 400 as input and generates semantic segmentation mask/image. In its initial form, the semantic segmentation mask/image may divide areas of the frame based on determined static object types such as, for example, pole, vegetation, sky, building, fence, etcetera. FIG. 5 illustrates an example segmentation mask 500 (derived from the previously described background image 400). Various distinguishable mask parts 510, 520, 530, 540, 550 and 580 are shown (in some examples, each of these parts may be given a corresponding color, with different colors for different static object types). In FIG. 5, the part 510 is building, the part 520 is pole, the part 530 is sidewalk, the part 540 is terrain, the part 550 is road, and the part 580 is fence.

Figure 6:
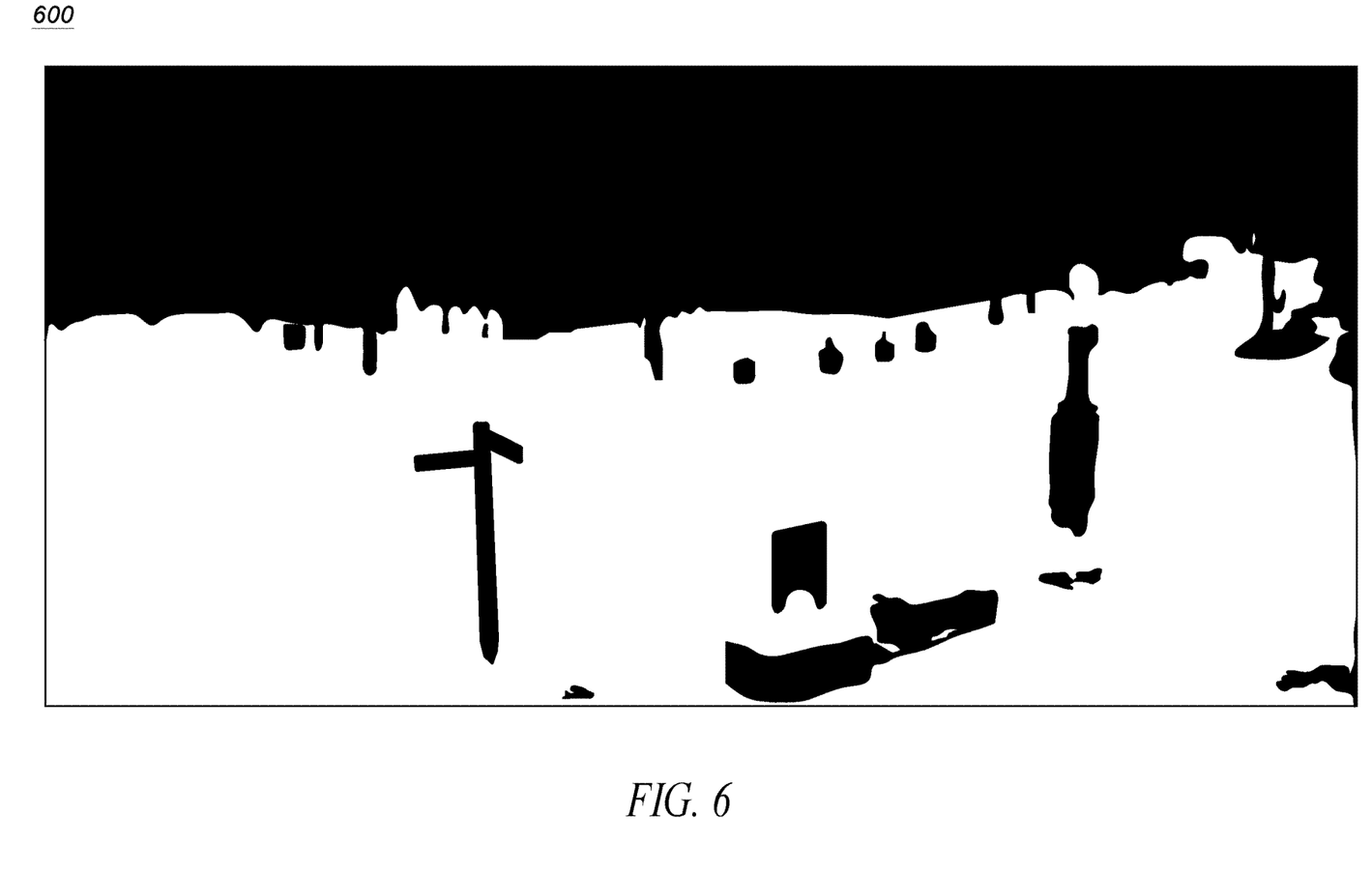
FIG. 6 is a diagram of an example binary mask that may be employed in connection with the example embodiment of FIG. 3.

Continuing on, as a next action in the masking preparation and application process, a binary mask is derived from the initial semantic segmentation mask/image. FIG. 6 is a diagram of an example binary mask 600. The black areas of the binary mask 600 are areas where moving objects are unlikely to appear, and the white areas of the binary mask 600 are areas where moving objects are likely to appear. Also, it should be understood that while in some examples one of two values is expected for each respective area (i.e. either yes—likely, or no—not likely), other examples may contemplate any suitable number of values more than two such as, for example, four possible values: i) 00=very unlikely; ii) 01=somewhat unlikely; iii) 10=somewhat likely; iv) 11=very likely.

Also, it is contemplated that one or more different binary masks for a different purpose than the binary mask 600 may be generated. For example, a tracker binary mask may be generated from the segmentation mask 500 where areas where occlusions are likely (for example, fence class, pole class, etcetera) are shown the opposite of areas where occlusions are not likely (for example, road class, terrain class, etcetera).

In some examples, the binary mask 600 is generated on the camera 108 that originally sent the background image (and it is generated after the camera receives the segmentation mask used to generate it). In other alternative examples, the binary mask is transmitted to the camera 108

(i.e. the camera that originally sent the background image) for use therein. For example, the binary mask 600 may be sent from the server 176, over the network 140, to the camera 108. Alternatively, the binary mask 500, before being sent to the camera via an XML string pipeline, may be converted to a base64 string. Other alternative example implementations that will be apparent to those skilled in the art, including those that may include one or more application programming interface(s), are also contemplated.

In addition to what has already been described above in relation to the video analytics determinator 282, information outputted from the video analytics determinator 282 may also inform as to frame area(s) where moving objects are likely to become at least partially occluded, temporarily, by one or more static objects (i.e. assuming movement to behind, not in front of, the one or more static objects). Static objects that may cause temporary occlusion include, for example, poles, vegetation, fences, certain types of buildings, etc. In response to this additional information, a tracking policy for a tracked moving object may be temporarily modified when the tracked moving object approaches the impacted frame area(s). As just one example of a tracking policy response/modification, so-called Kalman predictions generated within the computing system may be kept alive for longer frames when a tracked moving object approaches the at least one frame area. Thus, in accordance with some example embodiments, tracking policy may be informed by interactions between objects and the scene. In some examples, this may produce a benefit of reducing so-called object identification switching, where a moving object is incorrectly assigned a new object identification after re-emerging upon re-appearance from behind a temporary occlusion. Furthermore, in some examples even using machine learning to predictively learn occlusion exit point(s), or changing the type of tracker to account for potential occlusions is also contemplated. In regards to the latter, the tracker may, for example, be changed from a Kalman-type tracker to an appearance-type tracker (changes between other types of suitable trackers is also contemplated).

Continuing on and with reference once again to FIG. 3, the computer-implemented method 300 also includes repeatedly employing (330) the second video analytics determinator (for example, the video analytics determinator 280) on the video data over the time duration, and informed by the first information, to provide a refined object detection focus in second information.

In some examples, the refined object detection focus in second information provided by the comprises video analytics determinator 280 comprises a plurality of region proposals. In one example, region proposals in connection with object detection and tracking may be generated as described in US Pat. Publ. No. 2020/0097769 entitled "REGION PROPOSAL WITH TRACKER FEEDBACK". In other examples, region proposals in connection with object detection and tracking may be generated in some other manner such as, for example, as described in U.S. Pat. No. 11,170,267 entitled "METHOD, SYSTEM AND COMPUTER PROGRAM PRODUCT FOR REGION PROPOSALS". Also, regarding the binary mask 600 previously discussed, it will be understood that this or similar masks are intended to be employed in the generation of region proposals. In particular, the binary mask 600 may be employed as an information source in the creation of region proposals such as, for example, scores may be created for respective regions of the binary mask 600, and these may be added into (or weighted into) the final score for the proposed regions.

As should be apparent from this detailed description above, the operations and functions of the electronic computing device are sufficiently complex as to require their implementation on a computer system, and cannot be performed, as a practical matter, in the human mind. Electronic computing devices such as set forth herein are understood as requiring and providing speed and accuracy and complexity management that are not obtainable by human mental steps, in addition to the inherently digital nature of such operations (e.g., a human mind cannot interface directly with RAM or other digital storage, cannot transmit or receive electronic messages, electronically encoded video, electronically encoded audio, etc., and cannot communicatively interface with an object detector to inform the object detector as to the parts of video frames within which to operate, among other features and functions set forth herein).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element (s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "one of", without a more limiting modifier such as "only one of", and when applied herein to two or more subsequently defined options such as "one of A and B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled", "coupling" or "connected" as used herein can have several different meanings depending on the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through intermediate elements or devices via an electrical element, electrical signal or a mechanical element depending on the particular context.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. For example, computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A computer-implemented method comprising:
receiving, for at least a time duration, video data at an input of a computing system that includes:
first processor-executed video analytics that, over a first full length execution period, consumes a first processor resource allocation that is too large to be suitable for continuous repeated employment within a single camera device, and
second processor-executed video analytics, provided on the single camera device and having a second full length execution period, that consumes a second processor resource allocation taken from the single camera device, and the second processor-executed video analytics being suitable for being: repeatedly employed, and
at least substantially continuously active during such time when being repeatedly employed;
employing the first processor-executed video analytics to generate a semantic segmentation mask from a received background image, so as to permit the first processor-executed video analytics to provide a partial focus in first information that informs as to where moving objects are likely and unlikely to appear within video frames in respect of the video data; and
repeatedly employing the second processor-executed video analytics on the video data over the time duration, and informed by the first information, to provide a refined focus in second information used by an at least one object detector,
wherein the received background image is constructed from a plurality of intercepted video frames that are averaged for moving object removal.

2. The computer-implemented method as claimed in claim 1 wherein: the computing system further includes a server separate from the single camera device, the first processor-executed video analytics runs on the server and generates a semantic segmentation mask based on scene image information received from the single camera device, and the semantic segmentation mask is transmitted from the server to the single camera device after being generated.

3. The computer-implemented method as claimed in claim 2 wherein the semantic segmentation mask informs as to first frame areas where the moving objects are likely to appear and second frame areas, different than the first frame areas, that are masked out.

4. The computer-implemented method as claimed in claim 2 wherein the server is a cloud-based server.

5. The computer-implemented method as claimed in claim 1 wherein the first video processor-executed video analytics provides third information as to at least one frame area where the moving objects are likely to become at least partially occluded, temporarily, by one or more static objects.

6. The computer-implemented method as claimed in claim 5 wherein the one or more static objects are at least one of a pole, a fence and vegetation.

7. The computer-implemented method as claimed in claim 5 wherein, in response to the third information, a tracking policy for a respective tracked moving object is temporarily modified when the tracked moving object approaches the at least one frame area.

8. The computer-implemented method as claimed in claim 5 wherein, in response to the third information, Kalman predictions generated within the computing system are kept alive for longer frames when a tracked moving object approaches the at least one frame area.

9. The computer-implemented method as claimed in claim 5 wherein, in response to the third information: an exit location of a tracked moving object, adjacent the at least one frame area, is predicted to facilitate a tracking resumption in relation to the tracked moving object, or a search around a plurality of boundaries of the at least one frame area is carried out after the tracked moving object becomes occluded.

10. The computer-implemented method as claimed in claim 1 wherein the second processor-executed video analytics comprises a region proposer, and the refined focus in the second information comprises region proposals defining parts of a video frame within which the at least one object detector will be limited within which to operate.

11. The computer-implemented method as claimed in claim 1 further comprising receiving user input to selectively control a timing of the employing of the first processor-executed video analytics.

12. A computing system having an input, in operative association with an image sensor of a camera device, to receive video for at least a time duration during computing system operation, and the computing system comprising:
first processor-executed video analytics configured to:
consume a first processor resource allocation, over a first full-length execution period of the first processor-executed video analytics, that is too large to be suitable for continuous repeated employment within the camera device, and
generate a semantic segmentation mask from a received background image, so as to permit the first processor-executed video analytics to provide, by employment thereof within the computing system, a partial focus in first information that informs as to where moving objects are likely and unlikely to appear within video frames in respect of the video; and
second processor-executed video analytics, provided on the camera device, having a second full length execution period, and configured to:
consume a second processor resource allocation taken from the camera device, informatively employ the first information to determine a refined focus, and
provide the refined focus in second information used by an at least one object detector,
wherein: the second processor-executed video analytics is:
repeatedly employed on video data of the video over the time duration, and at least substantially continuously active during such time when being repeatedly employed, and
the received background image is constructed from a plurality of intercepted video frames that are averaged for moving object removal.

13. The computing system as claimed in claim 12 further comprising: a server separate from the camera device, and wherein: the first processor-executed video analytics is further configured to run on the server and generate a semantic segmentation mask based on scene image information received from the camera device, and the server is configured to transmit the semantic segmentation mask to the camera device after being generated.

14. The computing system as claimed in claim 13 wherein the semantic segmentation mask informs as to first frame areas where the moving objects are likely to appear and second frame areas, different than the first frame areas, that are masked out.

15. The computing system as claimed in claim 13 wherein: the second processor-executed video analytics comprises a region proposer, the refined focus in the second information comprises region proposals defining parts of a video frame within which the at least one object detector will be limited within which to operate, and in creating the region proposals, a further mask, derived from the semantic segmentation mask, is employed as an information source in scoring suitability of the region proposals.

16. The computing system as claimed in claim 13 further comprising at least one workstation or client device communicatively coupled to the server, the at least one workstation or client device configured to implement a user interface to receive user input to selectively control a timing of the employing of the first processor-executed video analytics.

17. The computing system as claimed in claim 12 wherein the first processor-executed video analytics is further configured to provide third information as to at least one frame area where the moving objects are likely to become at least partially occluded, temporarily, by one or more static objects.

18. The computing system as claimed in claim 12 further comprising at least one object detector, and wherein the second processor-executed video analytics comprises a region proposer, and the refined focus in the second information comprises region proposals defining parts of a video frame within which the at least one object detector will be limited within which to operate.

* * * * *